United States Patent
Fornage et al.

(10) Patent No.: US 9,960,707 B2
(45) Date of Patent: May 1, 2018

(54) PARALLEL POWER CONVERTER

(71) Applicant: Enphase Energy, Inc., Petaluma, CA (US)

(72) Inventors: Martin Fornage, Petaluma, CA (US); Erik Anthony Weyker, Sebastopol, CA (US)

(73) Assignee: Enphase Energy, Inc., Petaluma, CA (US)

( * ) Notice: Subject to any disclaimer, the term of this patent is extended or adjusted under 35 U.S.C. 154(b) by 277 days.

(21) Appl. No.: 14/841,010

(22) Filed: Aug. 31, 2015

(65) Prior Publication Data

US 2016/0066464 A1    Mar. 3, 2016

Related U.S. Application Data

(60) Provisional application No. 62/044,116, filed on Aug. 29, 2014.

(51) Int. Cl.
*H02J 1/00* (2006.01)
*H02M 7/44* (2006.01)
(Continued)

(52) U.S. Cl.
CPC ............. *H02M 7/44* (2013.01); *H02M 3/04* (2013.01); *H02M 7/003* (2013.01); *H02M 7/493* (2013.01);
(Continued)

(58) Field of Classification Search
CPC ........ H02M 7/44; H02M 7/003; H02M 7/493; H02M 3/04
(Continued)

(56) References Cited

U.S. PATENT DOCUMENTS

| 4,144,559 A | 3/1979 | Okumura et al. |
| 6,130,830 A | 10/2000 | Chen et al. |

(Continued)

FOREIGN PATENT DOCUMENTS

| EP | 1047179 A1 | 10/2000 |
| GB | 1096179 A | 12/1967 |

(Continued)

OTHER PUBLICATIONS

International Search Report and Written Opinion dated Dec. 7, 2015 for PCT Application No. PCT/US2015/047760.

(Continued)

*Primary Examiner* — Thomas Skibinski
(74) *Attorney, Agent, or Firm* — Moser Taboada

(57) ABSTRACT

Apparatus and system for power conversion. In one embodiment, the apparatus comprises a power converter comprising a first plate for receiving an input power; a second plate for providing an output power; a plurality of power converter bricks coupled in parallel between the first and the second plates, each power converter brick comprising (i) an input stage for converting a brick input power to a second power, (ii) an output stage, coupled to the input stage by a transformer, for converting the second power to a brick output power, (iii) a local controller coupled to the input stage for controlling power conversion by the power converter brick; and a master controller coupled to each power converter brick of the plurality of power converter bricks, wherein the master controller dynamically controls operation of each power converter brick of the plurality of power converter bricks to generate the output power.

20 Claims, 6 Drawing Sheets

(51) Int. Cl.
*H02M 3/04* (2006.01)
*H02M 7/00* (2006.01)
*H02M 7/493* (2007.01)
*H02M 1/00* (2006.01)

(52) U.S. Cl.
CPC .. *H02M 2001/0048* (2013.01); *Y02B 70/1491* (2013.01)

(58) Field of Classification Search
USPC .................................................. 307/82, 9.1
See application file for complete search history.

(56) References Cited

U.S. PATENT DOCUMENTS

| | | |
|---|---|---|
| 6,526,516 B1 | 2/2003 | Ishikawa et al. |
| 6,707,285 B2 | 3/2004 | Telefus et al. |
| 7,012,414 B1* | 3/2006 | Mehrotra ............. H02M 7/003 323/306 |
| 7,944,721 B2 | 5/2011 | Yang |
| 8,106,537 B2 | 1/2012 | Casey et al. |
| 8,279,645 B2 | 10/2012 | Bridge et al. |
| 2004/0095118 A1 | 5/2004 | Kernahan |
| 2010/0277143 A1 | 11/2010 | Kudo et al. |
| 2011/0170323 A1 | 7/2011 | Fulcher et al. |
| 2012/0175945 A1 | 7/2012 | Ciccone et al. |
| 2012/0256612 A1* | 10/2012 | Alonso ..................... H02J 7/35 323/311 |
| 2013/0027982 A1* | 1/2013 | Chapman ................. H02J 3/38 363/17 |

FOREIGN PATENT DOCUMENTS

| | | |
|---|---|---|
| JP | 2006204002 | 8/2006 |
| JP | 2012143049 A | 7/2012 |
| JP | 2013126335 A | 6/2013 |
| WO | WO 2011/133252 A2 | 10/2011 |

OTHER PUBLICATIONS

M. Kasper et al., "Scaling and Balancing of Multi-Cell Converters"; Proceedings of the International Power Electronics Conference—ECCE Asia, Hiroshima, Japan, May 18-21, 2014, 9 pgs.

* cited by examiner

PARALLEL POWER CONVERTER

CROSS-REFERENCE TO RELATED APPLICATION

This application claims priority to U.S. Provisional Patent Application No. 62/044,116 filed on Aug. 29, 2014, which is herein incorporated in its entirety by reference.

BACKGROUND OF THE INVENTION

Field of the Invention

Embodiments of the present disclosure generally relate to power conversion and, more particularly, to a method and apparatus for paralleling multiple low-power power converters.

Description of the Related Art

Power converters such as DC-DC converters and DC-AC inverters are employed in a wide variety of applications for converting an input power to a different output power. As the amount of power processed by an individual power converter increases, both converter control and efficient operation become more challenging and losses induced by higher levels of current become more difficult to eliminate.

Therefore, there is a need in the art for a method and apparatus for a power converter that can be simply and efficiently managed.

SUMMARY OF THE INVENTION

Embodiments of the present invention generally relate to an apparatus and system for power conversion as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
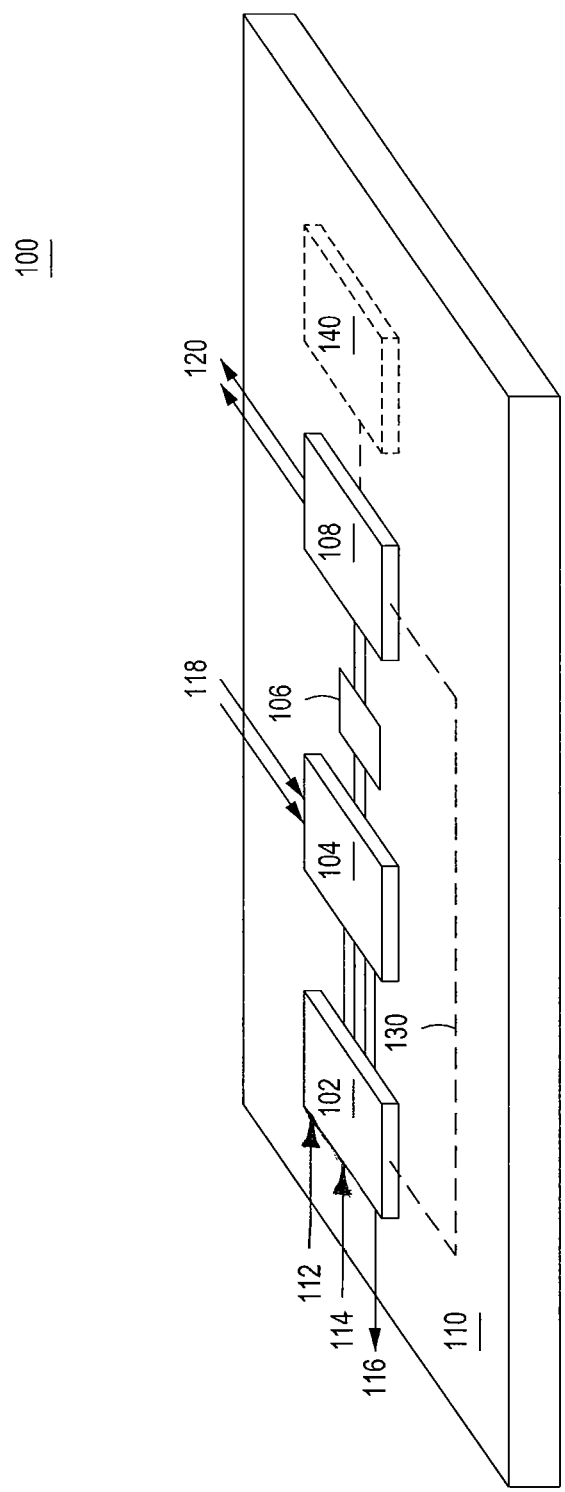
FIG. 1 is a block diagram of a power converter brick in accordance with one or more embodiments of the present invention.

FIG. 1 is a block diagram of a power converter brick 100 in accordance with one or more embodiments of the present invention. The power converter brick 100 ("brick 100") converts an input power to an output power and comprises a local controller chip 102, an input stage chip 104, a transformer 106, and an output stage chip 108 each mounted on a substrate 110. The local controller chip 102, the DC stage chip 104, and the output stage chip 108 are each integrated circuits (IC). The substrate 110 may be an electrically insulating, thermally conductive ceramic substrate, although in other embodiments other types of substrates may be used.

In some embodiments, such as the embodiment described below, the input stage chip 104 is a DC conversion stage (i.e., a DC stage chip 104). The DC stage chip 104 comprises two DC inputs 118 (i.e., an input terminal) for receiving a DC input power, and the output from the DC stage chip 104 is electrically coupled to the primary side of the transformer 106. The secondary side of the transformer 106 is electrically coupled to the output stage chip 108. The transformer 106 may be an electromagnetic or a piezoelectric transformer and, in some embodiments, the transformer 106 is embedded in the substrate 110 (the transformer 106 may be manufactured using any of a variety of different technologies such as printed windings surrounded by a magnetic core, a Piezoelectric transformer, or any other suitable means). The output stage chip 108 comprises two outputs 120 (i.e., an output terminal) for outputting the power generated by the brick 100.

In some embodiments, the brick 100 is a resonant converter and the DC stage chip 104 comprises a DC input bridge coupled to a resonant circuit. The DC input bridge may be a full H-bridge or a half H-bridge, formed by a plurality of switches (e.g., metal-oxide semiconductor field-effect transistors, or MOSFETs). In other embodiments, the brick 100 is a flyback converter and the DC stage chip 104 comprises a current control switch for controlling current flow through the transformer primary winding.

In certain embodiments, the brick 100 is a DC-DC converter and the output stage chip 108 comprises a DC output stage for generating a DC output. In one or more of such embodiments, the output stage chip 108 comprises one or more diodes (or other components operated as diodes) for generating the DC output.

In other embodiments, the brick 100 is a DC-AC inverter and the output stage chip 108 comprises one or more switches, such as bidirectional switches (e.g., two MOSFETs with sources coupled to one another to form a bidirectional switch), configured to generate a single-phase AC output. In one or more of such embodiments, the output stage chip 108 may be electrically coupled to the local controller chip 102 (as depicted by the dotted line 130) or to an AC control chip (shown in phantom as AC control chip 140) mounted on the substrate 110, for controlling the switches to generate the AC output by, for example, monitoring the voltages (e.g., the voltage polarity) across each of the switches on the output stage chip 108. In some embodiments, the AC control chip 140 and the output stage chip 108 may be two different dies; in other embodiments, the AC control chip 140 and the output stage chip 108 may be a single die. In certain embodiments where the output stage chip 108 comprises one or more bidirectional switches, each bidirectional switch is formed from two MOSFETs having their sources coupled to one another; additionally, one of the MOSFETs in each bidirectional switch may be held in a constant "ON" state while the second MOSFET acts as a diode or is controlled to switch on or off. For example, in some embodiments the output stage chip 108 comprises a cycloconverter comprising a plurality of switches.

In some embodiments, the DC stage chip 104 and/or the output stage chip 108 may comprise one or more bypass capacitors; alternatively, one of more bypass capacitors may be mounted on the substrate 110 and electrically coupled to the DC stage chip 104 or the output stage chip 108.

The local controller chip 102 is electrically coupled to the DC stage chip 104 for controlling one or more switches on the DC stage chip 104. In one or more alternative embodiments, the local controller chip 102 and the DC stage chip 104 may be a single custom IC rather than two separate chips. Although generally the output stage chip 108 is self-driven and requires no external communication (e.g., the output stage chip 108 may comprise one or more diodes that don't require any external control signal), in some embodiments the local controller chip 102 and/or another controller (e.g., 140) may be coupled to the output stage chip 108.

The local controller chip 102 has two master controller inputs 112 and 114 for receiving control signals from a master controller (described below with respect to FIG. 2), although in some embodiments the local controller chip 102 may have one or more additional inputs for receiving additional control instructions. The first master controller input 112 receives an operating state signal for either activating power conversion by the brick 100 (i.e., an "ON" signal) or deactivating the power conversion (i.e., an "OFF") signal. The second master controller input 114 receives a power direction signal for driving the brick 100 to generate either positive or negative power (i.e., for determining the direction of power flow).

The local controller chip 102 further has a master controller output 116 for transmitting a feedback signal, such as a 6-bit digital signal, to the master controller. In some embodiments the feedback signal includes power information indicating the amount of power being processed by the brick 100 (e.g., output power from the brick 100 may be measured or the local controller chip 102 may measure the input current to the DC stage chip 104 as a proxy for the amount of power processed), temperature information (e.g., operating temperature of the brick 100), frequency information (e.g., operating frequency of the brick 100), fault information (e.g., an overtemperature indication), or information related to other operating conditions for the brick 100.

In one or more embodiments, the brick 100 processes power on the order of 3 W. For example, the brick 100 may have DC current and voltage inputs on the order of 0.1 A and 30V, respectively, and generate AC current and voltage outputs on the order of 12 mA and 240V, respectively. By processing such a low power level as compared to a power converter that processes on the order of hundreds of watts of power, various operating parameters of brick 100 become more manageable. For example, each MOSFET device of a 300 W power converter may have an on-resistance Rds on the order of 0.1 ohm and dissipate on the order of 4 W of power, while each MOSFET device of the brick 100 may have an on-resistance Rds on the order of 10 ohms and dissipate only on the order of 40 mW of power. Additionally, the current through the brick 100 is also scaled down with respect to current through a high-power converter; as such, the current through the brick 100 is easily manageable.

Generally, technologies that can be integrated easily are used for the switches in the brick 100, such as MOS, LDMOS, and the like. Other technologies may also be used, such as GaN or SiC devices. When using GaN switches, native bidirectional switches can be used on the AC side, yielding better integration.

Figure 2:
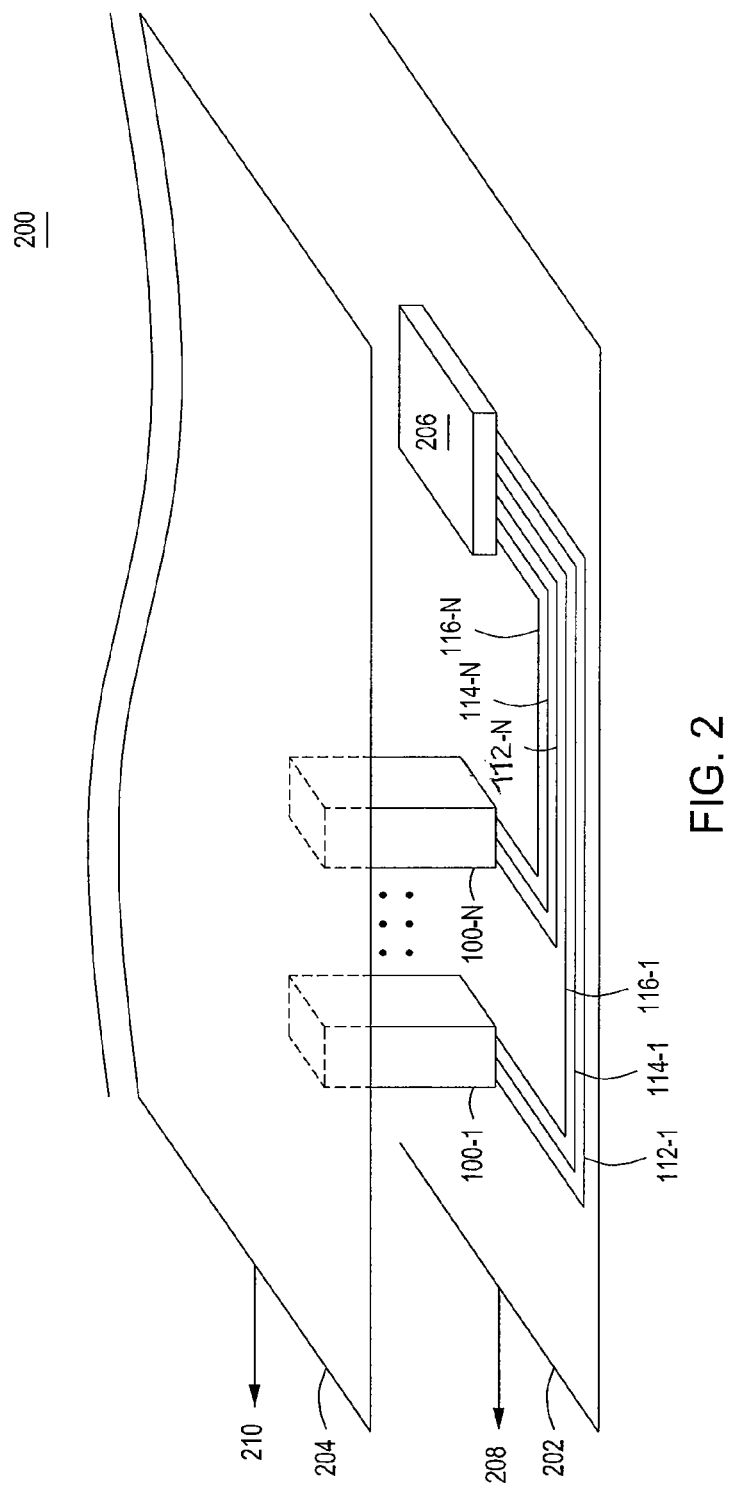
FIG. 2 is a diagram of a power converter brick array in accordance with one or more embodiments of the present invention.

FIG. 2 is a diagram of a power converter brick array 200 in accordance with one or more embodiments of the present invention. The power converter brick array 200 ("brick array 200") comprises bricks 100-1 through 100-N coupled between a first plate 202 and output second plate 204, where the first plate 202 and the second plate 204 may each be PC boards. The number of bricks 100 in the brick array 200 may generally be on the order of 20-100, although fewer or more bricks 100 may be used depending on the application and the amount of output power required. In general, a large amount of bricks 100 are needed to avoid harmonic distortion.

In some embodiments, such as the embodiment described below, the first plate 202 is a DC plate (i.e., DC plate 202) and the second plate 204 is an output plate (i.e., output plate 204), such as a DC output plate or an AC output plate. The DC input 118 of each brick 100 is electrically coupled to the DC plate 202 for receiving an input from a DC source that is coupled to the DC plate 202 by DC input 208. The DC source may be any suitable DC power source, such as a battery, a renewable energy source (e.g., one or more photovoltaic (PV) modules, wind turbines, hydro power, and the like), or the like. The output 120 of each brick 100 is electrically coupled to the output plate 204 for providing the generated power from the brick 100, and the output power from the brick 200 is coupled to an output via output 210.

In some embodiments, each of the bricks 100 is a bidirectional DC-DC converter and the brick array 200 converts an input DC power to an output DC power. In other embodiments, each of the bricks 100 is a single-phase DC-AC inverter and the brick array 200 converts received DC power to AC power that may then be coupled to an AC power line, such as a commercial power grid. In some of such embodiments, each of the bricks 100 may be a bidirectional inverter that, in addition to converting a DC input to an AC output, can convert an AC input to a DC output. In one or more embodiments, generated energy may be stored for later use using batteries, heated water, hydro pumping, H₂O-to-hydrogen conversion, or the like.

AC power generated by the brick array 200 may be single-phase AC power, split-phase AC power, two-phase AC power, or three-phase AC power. For generating single-phase AC power, the AC outputs from the bricks 100 are coupled to a pair of output lines at the output 210. For generating split-phase AC power, the single-phase AC outputs from a first group of bricks 100 are coupled to a first conductor line and a neutral line at the output 210, and the single-phase AC outputs from a second group of bricks 100 are coupled to a second conductor line and a neutral line at the output 210. The first and second groups of bricks 100 are then each controlled such that the output power at the output 210 is split-phase AC power.

For generating two-phase AC power, the single-phase AC outputs from a first group of bricks 100 are coupled to a first pair of output lines at the output 210, and the single-phase AC outputs from a second group of bricks 100 are coupled to a second pair of output lines at the output 210. The first and second groups of bricks 100 are then each controlled such that the output power at output 210 is a balanced two-phase AC output power. For generating three-phase AC power, the single-phase AC outputs from each of a first, a second, and a third group of bricks 100 are coupled to a first, a second, and a third pair of output lines, respectively, at the output 210. The three groups of bricks 100 are then each controlled such that the output power on the output 210 is a balanced three-phase AC output power.

The brick array 200 further comprises a master controller chip 206 physically coupled to the DC plate 202 (although in other embodiments the master controller chip 206 may be physically coupled to another location of the brick array 200, such as the output plate 204). The master controller chip 206 is an IC and is electrically coupled to the inputs 112 and 114 as well as the output 116 of each brick 100 for receiving information from and transmitting information to the bricks 100. In some other embodiments, the master controller chip 206 may also be electrically coupled to the output side of each brick 100.

The master controller chip 206 issues both operating state signals (i.e., "ON" and "OFF") and power direction signals (i.e., for generating positive power and negative power) to each of the bricks 100 for controlling power output from the brick array 200. Using the feedback signals received from the bricks 100, the master controller chip 206 coordinates the operation of each brick 100 and issues the corresponding control signals to each brick 100 for controlling which bricks 100 are active (i.e., "ON") at any given time and the direction of power flow through each of the bricks 100 that are on for generating real and/or reactive output power from the brick array 200 as needed. For example, all of the bricks 100 in the brick array 200 may be activated at the same time for operating at maximum power. When generating reactive power, the brick array 200 operates as a bidirectional converter that can provide power flow in either direction. The brick array 200 can provide a variety of different types of power conversion as well as bidirectional power flow, including DC-to-DC (either power flow direction), DC-to-AC, DC-to-AC with phase shift voltage/current (reactive power), and AC-to-DC. In those embodiments where phase shift is employed, the phase shift may be from +/−180 degrees.

The master controller chip 206 coordinates the operation of the bricks 100 in order to "spread" one or more of current, thermal dissipation, and electromagnetic interference (EMI) (conducted and radiated emission). For example, the master controller chip 206 may control the operation of the bricks 100 such that current is significantly uniformly distributed throughout both the DC plate 202 and the output plate 204, for example by spreading the current based on a current uniformity target. In some embodiments, a current uniformity target of 10% or better may be used, although other embodiments may use higher or lower current uniformity targets.

The master controller chip 206 may additionally or alternatively control the operation of the bricks 100 based on the temperature of each brick 100 to spread thermal dissipation such that a uniform (or substantially uniform) temperature is maintained across the brick array 200 and/or each brick 100 is operating at the same (or substantially the same) temperature. Analogous to the spread of current, the temperature spread may be based on a temperature uniformity target, for example 5 degrees Celsius although higher or lower temperature uniformity targets may be used.

The master controller chip 206 may further spread the conducted emission and radiated emission over a large spectrum by controlling the operating frequency of each brick 100 such that the bricks 100 operate over a large range of frequencies. For example, a first brick 100 may be operated at a frequency of 200 kHz, a second brick 100 may be operated at a frequency of 220 kHz, a third brick 100 may be operated at a frequency of 240 kHz, and the frequency may be similarly varied among the remaining bricks 100 in the brick array 200. By spreading the conducted emission and radiated emission in such a manner, the peak emission is significantly lower than that of a single power converting processing the same amount of overall power and less filtering at the output is required.

The master controller chip 206 may further perform optimization with respect to connection losses by privileging those bricks 100 closest to the high current port external connections. The master controller chip 206 may even further perform optimization based on a mixture of different criteria, such as the criteria described above, to identify one or more operating solutions based on meeting all targets (e.g., a temperature uniformity target $\Delta T < 5$ degrees Celsius, a current uniformity target $\Delta I/I < 10\%$, and $P_{loss} <$ a maximum $P_{loss}$ target).

In one or more embodiments where the brick array 200 generates AC output power, the master controller chip 206 coordinates the phase of the AC output from the various bricks 100. For example, when generating a three-phase AC output, the master controller chip 206 controls a first group of bricks 100 to generate a first AC output phase, a second group of bricks 100 to generate a second AC output phase, and a third group of bricks 100 to generate a third AC output phase such that the first, second and third AC output phases form a balanced three-phase signal from the brick array 200.

In addition to coordinating the operating states and power direction among the bricks 100 in the brick array 200, the master controller chip 206 controls all of the supervisory functions of each brick 100. Such supervisory functions may include maximum power point tracking (MPPT) (i.e., for DC sources that can be operated at a maximum power point (MPP), the brick array 200 can bias the DC source at the desired MPP), communications functions (e.g., for using power line communications when the brick array output is coupled to an AC power line, such as a commercial AC power grid), grid synchronization (i.e., when the brick array output is coupled to an AC power grid), voltage monitoring (e.g., DC voltage), current monitoring (e.g., DC current), frequency monitoring, and the like.

By coordinating the operating states and power direction among all of the bricks 100 in the brick array 200, the level and type (e.g., real, reactive, multi-phase) of output power from the brick array 200 can be controlled based on the number of bricks 100 operating at a given time and the direction of their power flow. As such, the power conversion control for each brick 100 is greatly simplified with respect to the control that would be required for a high-power converter. For example, AC power may be generated by the brick array 200 by controlling the number of bricks 100 operating at a given time where each brick 100 is generating a fixed level of power; as such, a single brick 100 is not required to generate a variable power level (e.g., from zero to a maximum power in small increments) and thus each brick 100 can be operated at its peak efficiency at a fixed low power level, thereby greatly simplifying the power conversion control. When operating such a low-power converter as a brick 100 at a fixed power level, an estimated power through the brick 100 can be used for controlling the power conversion rather than requiring an exact value; for example, current through the brick 100 can be easily measured and used as a proxy for the output power.

In some embodiments, each brick 100 is on the order of 10 mm×5 mm×15 mm and a 300 W brick array 200 is on the order of 100 mm×50 mm×15 mm. In certain embodiments, multiple brick arrays 200 may be "stacked" depending upon the amount of output power desired. For example, multiple brick arrays 200 may be electrically coupled to form a megawatt power converter.

As each stage is paralleled, fuses or fuse-like functions (such as positive temperature coefficient (FTC) devices/resettable fuses, semiconductor, and the like) are used to manage failure of a single brick 100 on both the DC and the AC ports, so that a unit that fails short on either side can be taken out of service and not disable the entire converter.

Figure 3:
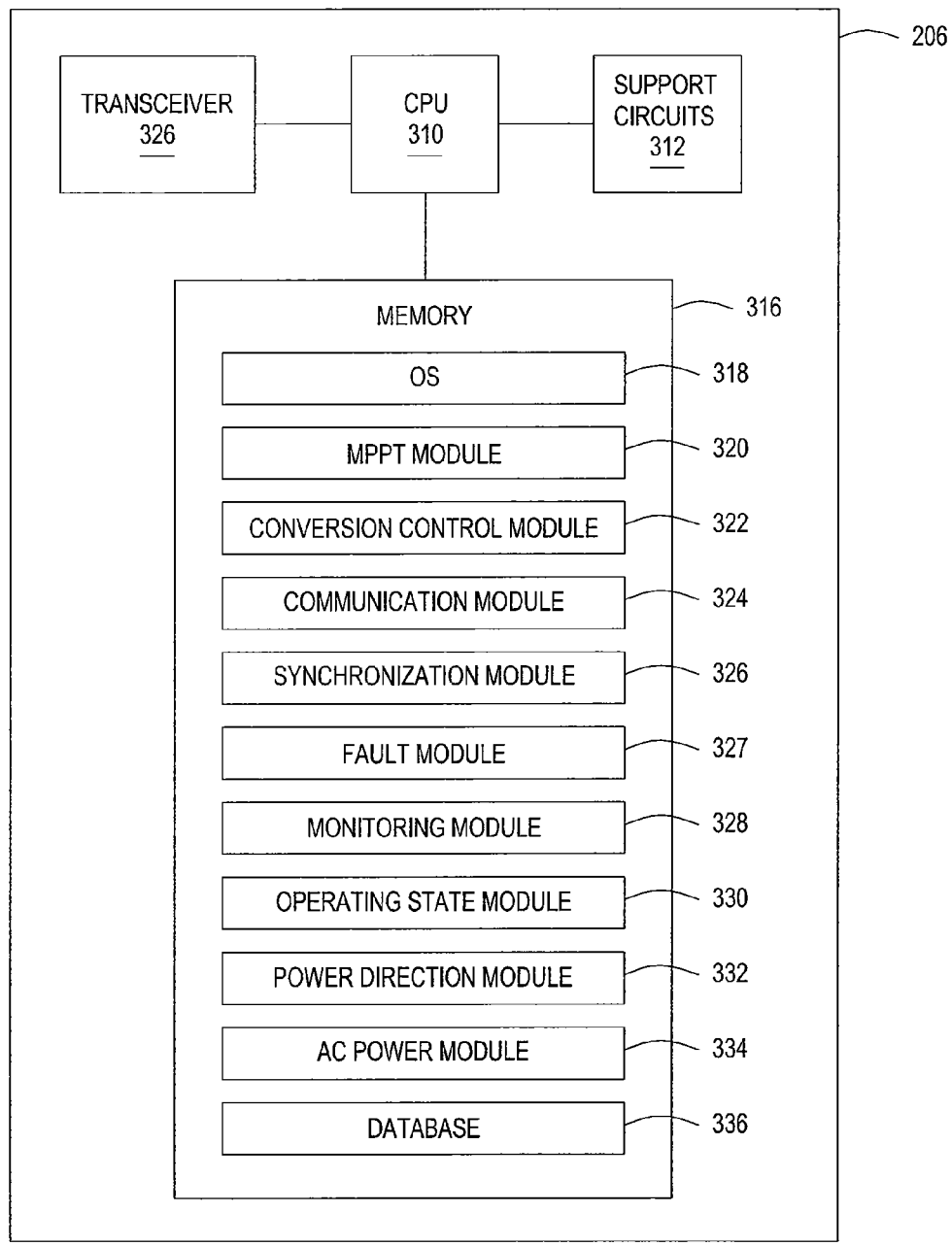
FIG. 3 is a functional block diagram of a master controller chip in accordance with one or more embodiments of the present invention.

FIG. 3 is a functional block diagram of a master controller chip 206 in accordance with one or more embodiments of the present invention. The master controller chip 206 comprises at least one central processing unit (CPU) 310 coupled to each of a transceiver 326, support circuits 312 and to a memory 316. The CPU 310 may comprise one or more processors, microprocessors, microcontrollers and combinations thereof configured to execute non-transient software instructions to perform various tasks in accordance with the present invention. In some embodiments, the CPU 310 may be a microcontroller comprising internal memory for storing controller firmware that, when executed, provides the controller functionality described herein. The CPU 310 may additionally or alternatively include one or more application specific integrated circuits (ASICs).

The transceiver 326 may, in some embodiments, be coupled to the output lines from the brick array 200 for communicating over the power lines using power line communications. Additionally or alternatively, the transceiver 326 may utilize wireless (e.g., based on standards such as IEEE 802.11, Zigbee, Z-wave, or the like) and/or other types of wired communication techniques for external communications.

The support circuits 312 are well known circuits used to promote functionality of the CPU 310. Such circuits include, but are not limited to, a cache, power supplies, clock circuits, buses, network cards, input/output (I/O) circuits, and the like. The master controller chip 206 may be implemented using a general purpose computer that, when executing particular software, becomes a specific purpose computer for performing various embodiments of the present invention.

The memory 316 may comprise random access memory, read only memory, removable disk memory, flash memory, and various combinations of these types of memory. The memory 316 is sometimes referred to as main memory and may, in part, be used as cache memory or buffer memory. The memory 316 generally stores the operating system (OS) 318 of the master controller chip 206. The operating system 318 may be one of a number of commercially available operating systems such as, but not limited to, Linux, Real-Time Operating System (RTOS), and the like.

The memory 316 stores non-transient processor-executable instructions and/or data that may be executed by and/or used by the CPU 310. These processor-executable instructions may comprise firmware, software, and the like, or some combination thereof.

The memory 316 stores various forms of application software, such as a maximum power point tracking (MPPT) module 320 for operating each of the bricks 100 such that one or more DC sources are biased at a maximum power point (MPP); a conversion control module 322 for controlling the power conversion of each brick 100; a communications module 324 for controlling communications for the brick array 200, for example for power line communications with an external system controller; a synchronization module 326 for synchronizing the AC output from each brick 100 and the brick array 200 with an AC line coupled to the output plate 204; a fault module 327 for monitoring each brick 100 for fault indications and generating suitable control signals in response to any faults; and a monitoring module 328 for monitoring one or more of current, voltage, frequency, and power from each brick 100.

In addition to the aforementioned modules, the memory 316 further stores additional application software for coordinating operation of the bricks 100 across the brick array 200 to achieve the desired operating state for the brick array 200, for example for generating the desired output power from the brick array 200, for spreading one or more of current, frequency, thermal dissipation, and electromagnetic interference (EMI), and the like. Such application software may include an operating state module 330 for determining an operating state (i.e., "ON" or "OFF") for each brick 100 and generating the appropriate operating state signals for each brick 100 (the granularity of such control signals may be on the order of tens of µsec, such as 10-100 µsec); a power direction module 332 for determining the direction of power flow (i.e., positive or negative power) for each brick 100 and generating the appropriate operating state signals for each brick 100; and an AC power module 334 for coordinating operation among two or more groups of bricks 100 to generate a split-phase or multi-phase AC output from the brick array 200. The memory 316 may additionally comprise a database 336 for storing various data related to the operation of one or more of the bricks 100 and/or the overall brick array 200.

Figure 4:
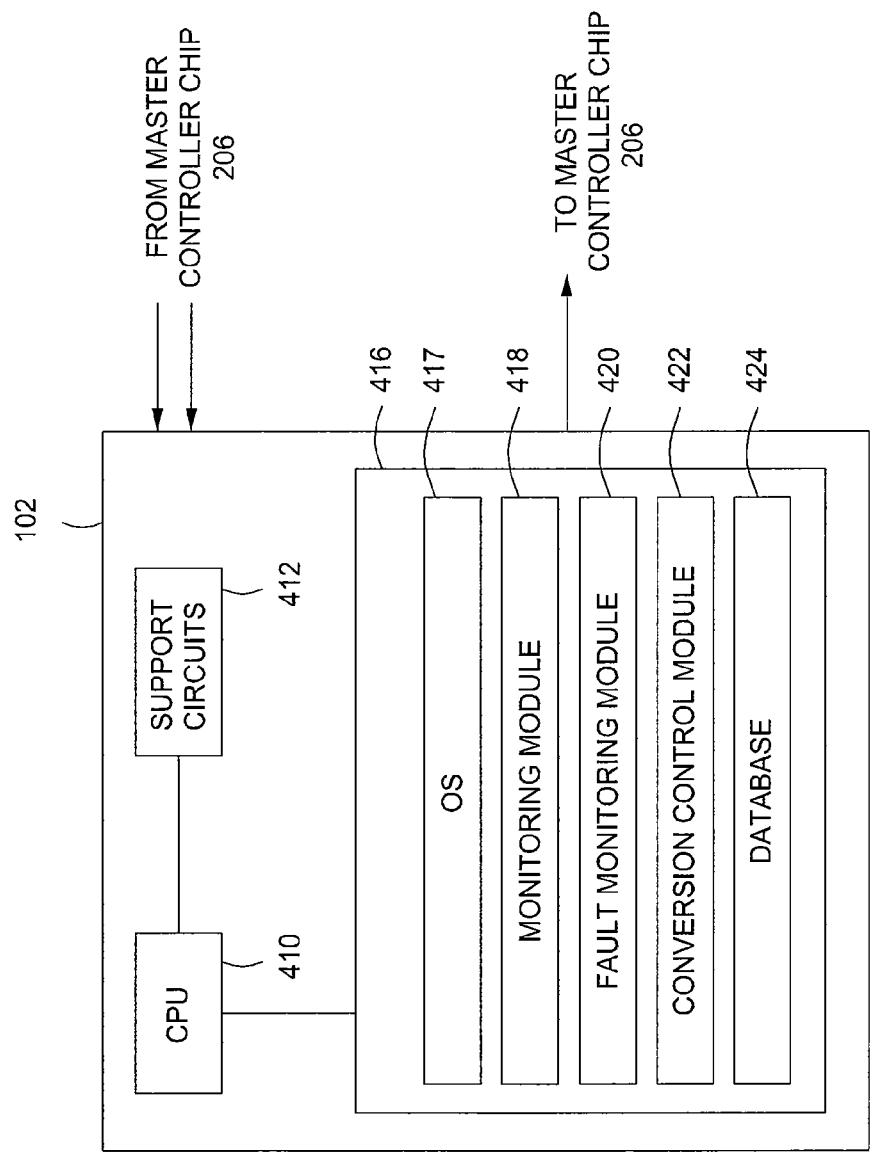
FIG. 4 is a functional block diagram of a local controller chip in accordance with one or more embodiments of the present invention.

FIG. 4 is a functional block diagram of a local controller chip 102 in accordance with one or more embodiments of the present invention. The local controller chip 102 comprises at least one central processing unit (CPU) 410 coupled to each of support circuits 412 and to a memory 314. The CPU 410 may comprise one or more processors, microprocessors, microcontrollers and combinations thereof configured to execute non-transient software instructions to perform various tasks in accordance with the present invention. In some embodiments, the CPU 410 may be a microcontroller comprising internal memory for storing controller firmware that, when executed, provides the controller functionality described herein. The CPU 410 may additionally or alternatively include one or more application specific integrated circuits (ASICs).

The support circuits 412 are well known circuits used to promote functionality of the CPU 410. Such circuits include, but are not limited to, a cache, power supplies, clock circuits, buses, network cards, input/output (I/O) circuits, and the like. The local controller chip 102 may be implemented using a general purpose computer that, when executing particular software, becomes a specific purpose computer for performing various embodiments of the present invention.

The memory 416 may comprise random access memory, read only memory, removable disk memory, flash memory, and various combinations of these types of memory. The memory 416 is sometimes referred to as main memory and may, in part, be used as cache memory or buffer memory. The memory 416 generally stores the operating system (OS) 417 of the local controller chip 102. The operating system 417 may be one of a number of commercially available operating systems such as, but not limited to, Linux, Real-Time Operating System (RTOS), and the like.

The memory 416 stores non-transient processor-executable instructions and/or data that may be executed by and/or used by the CPU 410. These processor-executable instructions may comprise firmware, software, and the like, or some combination thereof.

The memory 416 stores various forms of application software, such as a monitoring module 418 for monitoring one or more of power, current, voltage and frequency for the brick 100 and transmitting the corresponding feedback signals to the master controller chip 206; a fault monitoring module 420 for monitoring for one or more fault indications (e.g., an overtemperature fault) in the brick 100 and transmitting the corresponding feedback signals to the master controller chip 206; a conversion control module 422 for generating the switch control signals for the brick 100 based on the received control signals from the master controller chip 206; and a database 424 for storing various data related to the operation of brick 100.

Figure 5:
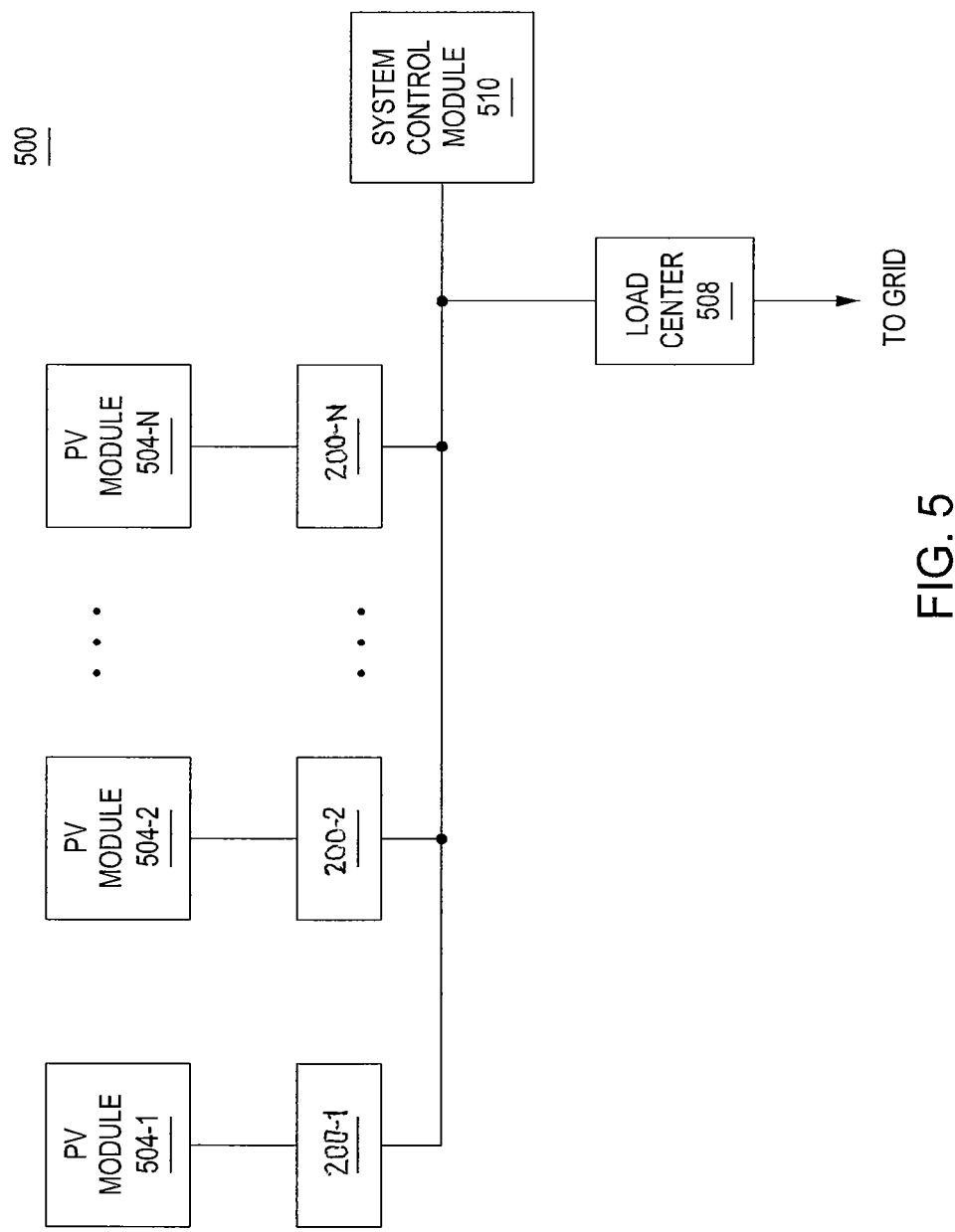
FIG. 5 is a block diagram of a system for distributed generation (DG) in accordance with one or more embodiments of the present invention.

FIG. 5 is a block diagram of a system 500 for distributed generation (DG) in accordance with one or more embodiments of the present invention. This diagram only portrays one variation of the myriad of possible system configurations. The present invention can function in a variety of distributed power generation environments and systems.

The system 500 comprises a plurality of brick arrays 200$_1$, 200$_2$ . . . 200$_n$, collectively referred to as brick arrays 200, a plurality of PV modules 504$_1$, 504$_2$ . . . 504$_n$, collectively referred to as PV modules 504, an AC bus 506, a load center 508, and a system control module 510.

Each brick array 200$_1$, 200$_2$ . . . 200$_n$ is coupled to a PV module 504$_1$, 504$_2$ . . . 504$_n$, respectively, in a one-to-one correspondence and converts DC power from the corresponding PV module 504 to AC power. In some embodiments, each brick array 200 is a 300 W converter having a 30V DC input and a 240V AC output. The brick arrays 200 are coupled to the AC bus 506, which in turn is coupled to the system control module 510 and the load center 508. The system control module 510 (e.g., a gateway) is capable of communicating with the brick arrays 200, for example for issuing command and control signals to the brick arrays 200 and/or for receiving information from the brick arrays 200. In some embodiments, the system control module 510 may be a gateway for receiving information from and/or sending information to another device (such as a remote master controller), for example via the Internet. In such embodiments, the system control module 510 may communicate information pertaining to the brick arrays 200 (e.g., performance data) to a remote master controller, and/or communicate data from the remote master controller (e.g., control commands) to one or more of the brick arrays 200.

The load center 508 houses connections between incoming power lines from a power grid distribution system (such as a commercial grid) and the AC bus 506.

The brick arrays 200 convert DC power from the PV modules 504 into AC power that is power grid compliant and couple the generated AC power to the grid via the load center 508. Additionally or alternatively, the generated power may be distributed for use via the load center 508 to one or more appliances, and/or the generated energy may be stored for later use, for example using batteries, heated water, hydro pumping, $H_2O$-to-hydrogen conversion, or the like.

In some other embodiments, other DC sources may be used in addition to or in place of the PV modules 504 (e.g., batteries, other types of renewable energy sources such as wind, hydro, or the like).

In certain embodiments, the system 500 comprises one or more energy storage mediums (such as batteries) coupled to one or more brick arrays 200 that convert AC power received from the AC bus 506 to DC output that is stored in the energy storage mediums.

In some alternative embodiments, the brick arrays 200 are DC-DC converters that are coupled to a DC distribution bus (rather than the AC bus 506) for coupling generated DC power from the brick arrays 200 to one or more DC devices and/or a DC distribution grid. In some of such embodiments, one or more energy storage mediums (such as batteries) are coupled to one or more brick arrays 200 that convert DC power received from the DC bus to a DC output that is stored in the energy storage mediums.

Figure 6:
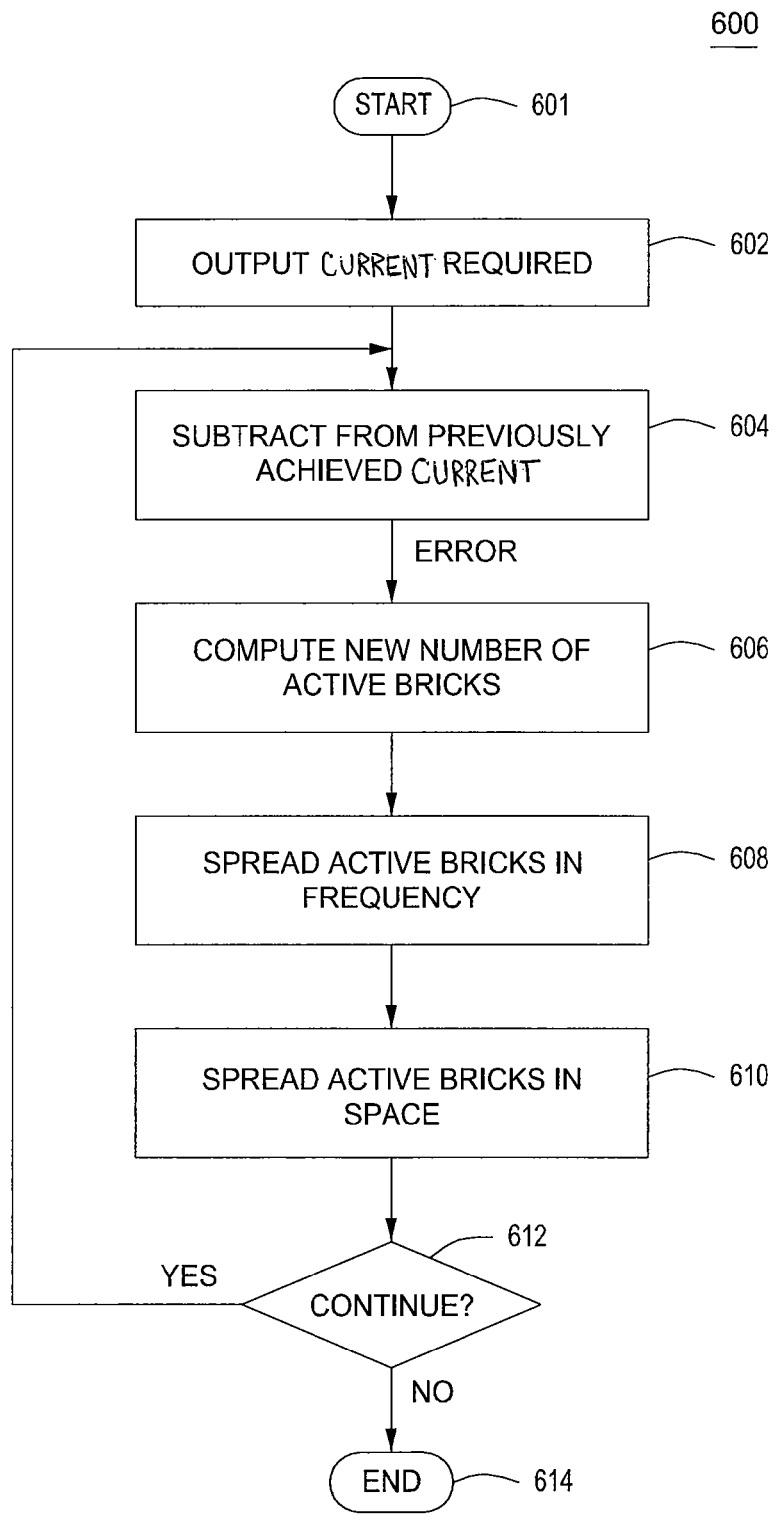
FIG. 6 is a flow diagram of a control loop in accordance with one or more embodiments of the present invention.

FIG. 6 is a flow diagram of a method 600 for operating a brick array 200 in accordance with one or more embodiments of the present invention. The method 600 is a control loop for operating a brick array 200; in one or more embodiments, the method 600 is an implementation of one or more modules of the memory 316, such as the operating state module 330 and the power direction module 322.

The method 600 begins at step 601. At step 602, the output current required from the brick array 200 is determined. The method 600 proceeds to step 604, where the required output current is subtracted from the previously achieved current to determine an error amount. At step 606, a new number of active bricks 100 is computed based on the error amount and the brick array 200 is operated with the determined number of active bricks 100. The method 600 proceeds to step 608, where the active bricks 100 are spread in frequency. At step 610, the active bricks 100 are spread in space.

The method 600 proceeds to step 612, where a determination is made whether to continue operating the brick array 200. If the result of the determination is yes, to continue operating the brick array 200, the method 600 then returns to step 604. If the result of the determination is no, to not continue operating the brick array 200, the method 600 proceeds to step 614 where it ends.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. Apparatus for power conversion comprising:
   a power converter comprising:
      a first plate for receiving an input power;
      a second plate for providing an output power;
      a plurality of power converter bricks coupled in parallel between the first and the second plates, wherein each power converter brick of the plurality of power converter bricks comprises (i) an input stage for converting a brick input power to a second power, (ii) an output stage, mounted on the same substrate as the input stage and coupled to the input stage by a transformer, for converting the second power to a brick output power, (iii) a local controller coupled to the input stage for controlling power conversion by the power converter brick; and
   a master controller coupled to each power converter brick of the plurality of power converter bricks, wherein the master controller dynamically controls operation of each power converter brick of the plurality of power converter bricks to generate the output power.

2. The apparatus of claim 1, wherein the master controller individually controls each power converter brick of the plurality of power converter bricks to be either (i) generating no power or (ii) generating a fixed power level.

3. The apparatus of claim 1, wherein the master controller individually controls a direction of power flow through each power converter brick of the plurality of power converter bricks.

4. The apparatus of claim 1, wherein the master controller controls operation of each power converter brick of the plurality of power converter bricks such that a first current is distributed through the first plate to meet a first uniformity target and a second current is distributed throughout the second plate to meet a second uniformity target.

5. The apparatus of claim 1, wherein the master controller controls operation of each power converter brick of the plurality of power converter bricks based on the temperature of each brick to meet a temperature uniformity target.

6. The apparatus of claim 1, wherein the master controller controls an operating frequency of each power converter brick of the plurality of power converter bricks such that conducted and radiated emissions are spread over a spectrum.

7. The apparatus of claim 1, wherein the input power is a first DC power and the output power is a second DC power.

8. The apparatus of claim 1, wherein the input power is a DC power and the output power is an AC power.

9. The apparatus of claim 8, wherein each brick of the plurality of bricks generates a single-phase AC power.

10. The apparatus of claim 9, wherein the master controller controls a first group of power converter bricks of the plurality of power converter bricks and a second group of power converter bricks of the plurality of power converter bricks such that the AC power is a split-phase AC power.

11. The apparatus of claim 9, wherein the AC power is a balanced three-phase power and the master controller controls (i) a first group of power converter bricks of the plurality of power converter bricks to generate a first phase of the AC power, (ii) a second group of power converter bricks of the plurality of power converter bricks to generate a second phase of the AC power, and (iii) a third group of power converter bricks of the plurality of power converter bricks to generate a third phase of the AC power.

12. The apparatus of claim 8, wherein the master controller communicates using power line communication via an AC line to which the AC power is coupled.

13. The apparatus of claim 1, wherein the master controller controls each brick of the plurality of power converter bricks to bias a DC source of the power converter at its maximum power point (MPP).

14. The apparatus of claim 1, wherein the first and the second plates are each PC boards.

15. The apparatus of claim 1, wherein, for each power converter brick of the plurality of power converter bricks, the input stage, the output stage, and the local controller are each integrated circuits (ICs).

16. The apparatus of claim 1, wherein the local controller of each power converter brick couples a digital feedback signal to the master controller, wherein the digital feedback signal indicates at least one of amount of power being processed by the power converter brick, temperature information for the power converter brick, operating frequency of the power converter, or fault information for the brick.

17. The apparatus of claim 1, wherein each power converter brick of the plurality of power converter bricks processes power on the order of 3 Watts.

18. A system for power conversion, comprising:
a plurality of photovoltaic (PV) modules; and
a plurality of power converters coupled to the plurality of PV modules in a one-to-one correspondence, wherein each power converter of the plurality of power converters comprises:
a first plate for receiving an input power from a corresponding PV module;
a second plate for providing an output power;
a plurality of power converter bricks coupled in parallel between the first and the second plates, wherein each power converter brick of the plurality of power converter bricks comprises (i) an input stage for converting a brick input power to a second power, (ii) an output stage, mounted on the same substrate as the input stage and coupled to the input stage by a transformer, for converting the second power to a brick output power, (iii) a local controller coupled to the input stage for controlling power conversion by the power converter brick; and
a master controller coupled to each power converter brick of the plurality of power converter bricks, wherein the master controller dynamically controls operation of each power converter brick of the plurality of power converter bricks to generate the output power.

19. The system of claim 18, wherein the input power is a first DC power and the output power is a second DC power.

20. The system of claim 18, wherein the input power is a DC power and the output power is an AC power.

* * * * *